United States Patent [19]

Nutting

[11] Patent Number: 4,647,987
[45] Date of Patent: Mar. 3, 1987

[54] MODIFIED SYNCHRONIZATION IN APPARATUS FOR RECORDING AND REPRODUCING SINGLE FIELD NON-INTERLACED IMAGES

[75] Inventor: Thomas C. Nutting, Fairport, N.Y.

[73] Assignee: Eastman Kodak Company, Rochester, N.Y.

[21] Appl. No.: 709,260

[22] Filed: Mar. 7, 1985

[51] Int. Cl.⁴ .......................................... H04N 5/781
[52] U.S. Cl. ................... 360/37.1; 360/35.1; 360/10.1; 358/342; 358/906
[58] Field of Search ............... 360/37.1, 35.1, 10.1, 360/73; 358/335, 342, 906, 150, 288

[56] References Cited

U.S. PATENT DOCUMENTS

| | | | |
|---|---|---|---|
| 3,636,253 | 1/1972 | Notani et al. | 360/35.1 |
| 3,893,169 | 7/1975 | Hall, Jr. | 360/37.1 |
| 3,944,728 | 3/1976 | Ferrari | 358/342 |
| 4,058,840 | 11/1977 | Kasprzak | 360/10.1 |
| 4,090,218 | 5/1978 | Van Buul et al. | 358/342 X |
| 4,133,009 | 1/1979 | Kittler et al. | 358/906 X |
| 4,236,050 | 11/1980 | Winslow et al. | 360/73 X |
| 4,267,564 | 5/1981 | Flores | 360/73 X |
| 4,366,501 | 12/1982 | Tsunekawa et al. | 358/906 X |
| 4,470,076 | 9/1984 | Arai et al. | 358/906 X |
| 4,481,543 | 11/1984 | Saito | 360/35.1 X |
| 4,504,866 | 3/1985 | Saito | 360/35.1 X |

*Primary Examiner*—Raymond F. Cardillo
*Assistant Examiner*—Wayne R. Young
*Attorney, Agent, or Firm*—Robert F. Cody

[57] ABSTRACT

A magnetic disk recording apparatus is disclosed having a synchronization modification circuit utilized to control the rotational speed of a magnetic disc, whereby an integer number of horizontal lines of a standard video signal are recorded on one annular track of the magnetic disc. When the recorded video signal is repeatedly reproduced, a non-interlaced single field "still" video image is displayed on a standard monitor adapted to display an interlaced image.

9 Claims, 10 Drawing Figures

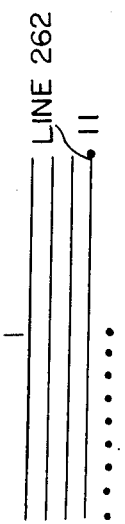
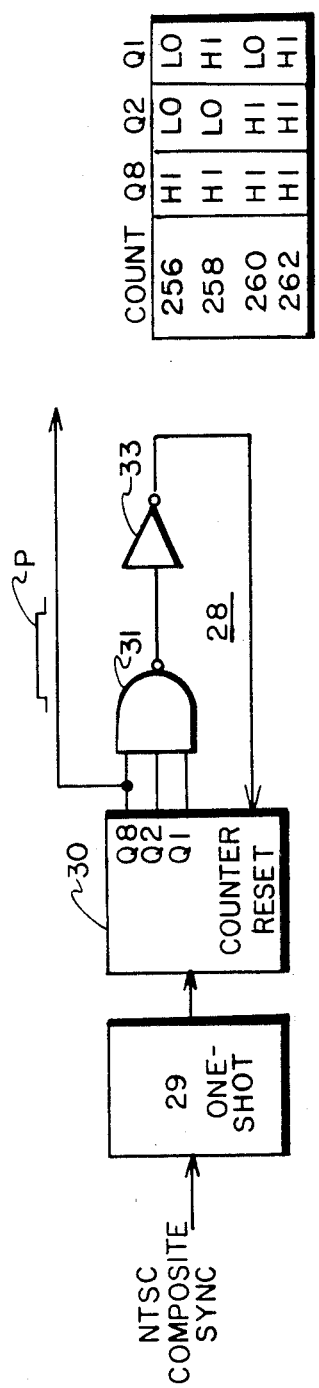
FIG. 7
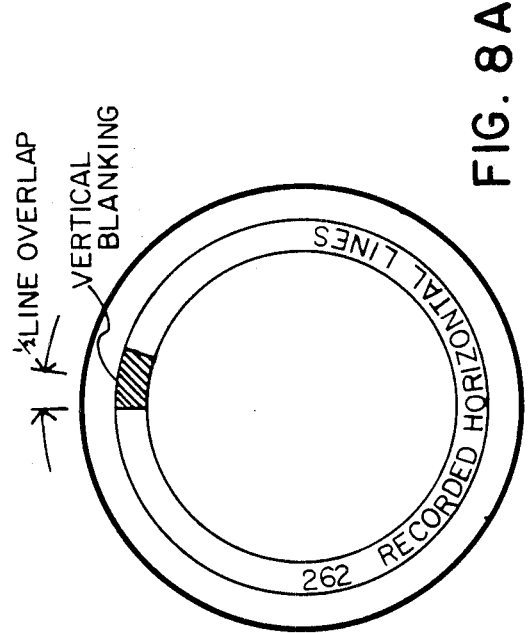
FIG. 8A
FIG. 8B

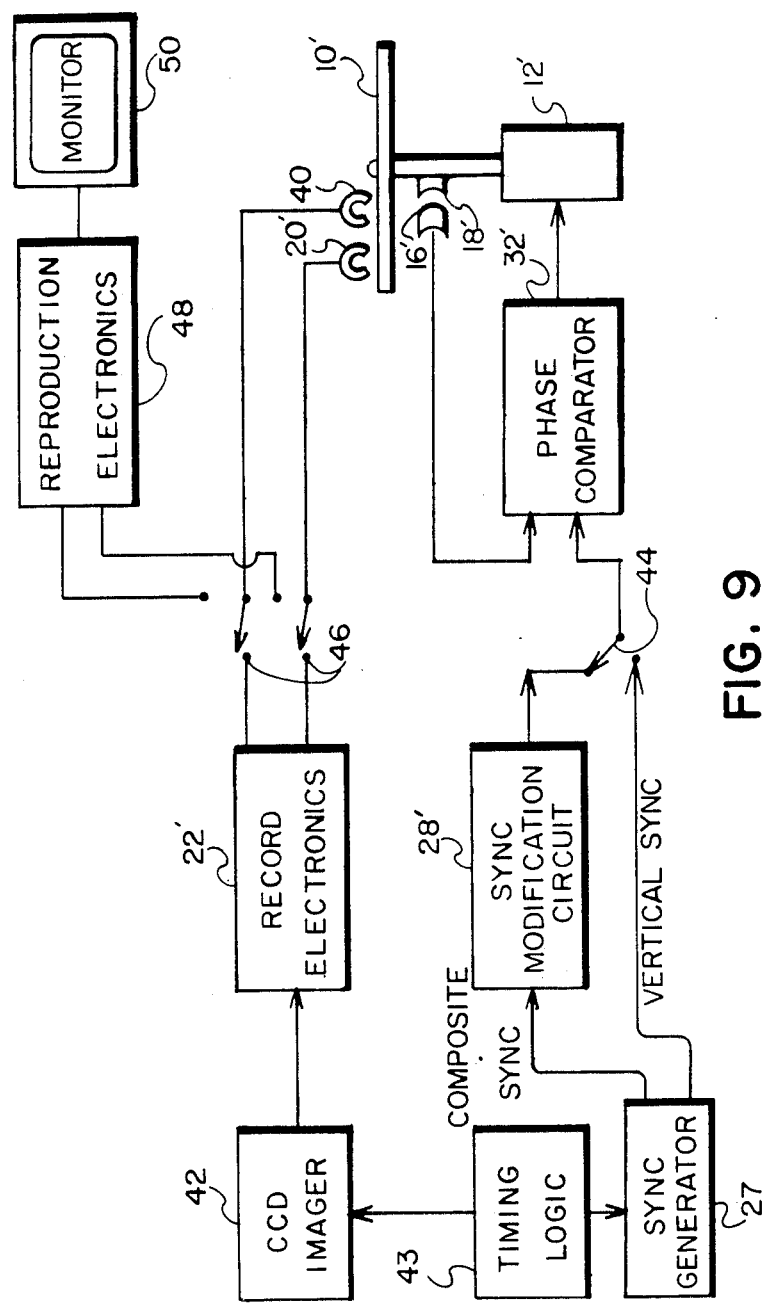

MODIFIED SYNCHRONIZATION IN APPARATUS FOR RECORDING AND REPRODUCING SINGLE FIELD NON-INTERLACED IMAGES

BACKGROUND OF THE INVENTION

1. Field of the Invention

The present invention relates to magnetic disc recording apparatus. Specifically, the invention provides an improved apparatus for recording and reproducing non-interlaced single field "still" video images.

The invention, as well as prior art for the invention, is described with reference to the accompaning figures, of which:

FIG. 1 is a representation of the video scanning pattern of a standard frame of an interlaced video signal, FIG. 2 is a diagram of the prior art recording of a full frame on one annular track of a recording disc, FIG. 3 is a representation of the video scanning pattern of prior art interlaced single field recording, FIG. 4 is a diagram of the prior art recording of a single field on one annular track of a recording disc, FIG. 5 is a representation of the video scanning pattern produced from the reproduction of the video information on the recorded track of FIG. 4, FIG. 6 is a block diagram showing an embodiment of the present invention, FIG. 7 is a schematic diagram of a synchronization modification circuit, FIG. 8A is a diagram of a recorded track produced by the apparatus in FIG. 6, FIG. 8B is a representation of the video scanning pattern produced from the reproduction of the video information on the recorded track of FIG. 8A, and FIG. 9 is a block diagram of an electronic still camera system incorporating the present invention.

2. Description Relative to the Prior Art

An interlaced video signal consists of a sequence of video frames, each frame having two interlaced video fields. As shown in FIG. 1, the scanning of a first field, i.e. field one, on a video monitor begins at a point 2 with a full horizontal line of video information and ends at a point 4 with a half line. After field one is scanned, the scanning beam of the video monitor is returned to a point 6 by a vertical deflection signal that is present in the video signal; then the scanning of the second field, i.e. field two, is begun. Field two begins with a half line and ends with a full horizontal line at a point 8. When the scanning beam reaches the point 8, the vertical deflection signal causes the beam to return to the point 2. Scanning of the first field of the next frame in the sequence is then begun. In this manner, a sequence of video frames is scanned on a monitor, thereby producing a "motion" picture.

Magnetic disc recorders have been used to record a single frame of an interlaced video signal so that when the video frame is repeatedly reproduced and supplied to a video monitor a still video image is displayed. Single frame still image recording is accomplished by recording, in sequence, both fields of a single video frame on one annular track of a magnetic disc. As shown in FIG. 2, when the video information on the recorded track is continuously reproduced and supplied to a video monitor, the scanning pattern shown in FIG. 1 is repeated. Instead of a sequence of different video frames being displayed, however, a single frame is repeatedly shown on the monitor so as to produce a "still" video image.

The use of single frame still image recording is satisfactory when the subject shown in the video frame—at the time of frame-capture—is not moving rapidly. If the subject is in rapid motion, however, the first and second fields may differ significantly due to the spatial displacement of the subject during the time interval between the scanning of the two fields. The spatial displacement causes unacceptable distortion to the image displayed on the video monitor.

One approach to the problem of spatial displacement is to display only one field of the video frame twice in an interlaced fashion. U.S. Pat. No. 4,058,840 discloses an apparatus for producing single field interlaced still video images. Referring to FIG. 3, a single field is first scanned in a normal fashion starting at a point 2 and ending at a point 4. The vertical deflection signal then returns the scanning beam to a point 6. To repeat the same field in an interlaced fashion, a half line "blank" or delay is employed to allow the scanning beam to move to a point 7 before beginning to re-scan the field. If the half line delay were not employed, the start of each horizontal line of every other displayed field would start somewhere along the line 6-4 of FIG. 3. While this does solve the problem of spatial displacement in rapidly moving subjects, it creates a second problem of vertical "jitter", caused by the display of identical video information in successive horizontal display lines. The problem of vertical "jitter" and spatial displacement in still video images can be overcome by the use of "non-interlaced" single field recording.

It is known in the art to record a single field of an interlaced video signal in a format that will produce a "non-interlaced" still video image when the recorded video field is repeatedly reproduced. U.S. Pat. No. 3,636,253 discloses a magnetic disc recorder that records a single field followed by a "blank" half line on one annular track of a magnetic disc as shown in FIG. 4. As shown in FIG. 5, the addition of the half line "blank" causes the scanning beam to continue to a point 9. The vertical deflection signal will then reset the beam to the point 2 instead of to the point 6. When the video information on the recorded track is repeatedly reproduced, a single field "non-interlaced" image is produced.

The advantages of "non-interlaced" single field recording are obvious. The magnetic storage requirement to record an image is reduced by one-half compared to a full-frame image system while still producing an image of acceptable quality to the average person. The image reproduced from non-interlaced single field recording is also free from vertical "jitter", caused by the display of identical video information in successive horizontal display lines, that is present in images reproduced from interlaced single field recording.

While the prior art apparatus (U.S. Pat. No. 3,636,253) for recording non-interlaced single field images does provide the above-mentioned benefits, it requires about twice the amount of "hardwardware" as a conventional magnetic disc recorder. The requirement for additional hardware is necessitated by the use of the vertical synchronization signal to control the rotational speed of its magnetic disc. The requirement of twice the amount of hardware than is employed in a conventional recorder is an unacceptable tradeoff in the design of a hand held electronic "still" camera, where the objective is to conserve magnetic disc space and reduce the size of the overall image recording system.

The problem then, which is the basis of the present invention, is to produce a magnetic disc recorder that provides the benefits of single field "non-interlaced" recording, i.e. good single field image quality and the reduction in the amount of magnetic storage space required to record such images, without the drawbacks of doubling the amount of hardware required for such a recorder.

SUMMARY OF THE INVENTION

Whereas the prior art teaches the use of the vertical synchronization signal of a standard video signal to control the rotational phase of a magnetic recording disc, the present invention departs from the prior art by utilizing for such purposes a modified synchronization signal. The use of a modified synchronization signal permits the recording of an integer number of horizontal video lines from a single field of a standard video signal on one annular track of a magnetic recording disc so that, when the video information on the recorded track is continuously reproduced, a signal corresponding to a single field non-interlaced image is generated.

In a presently preferred form of the invention, the synchronization modification circuit takes the form of a divide-by-262 counter which produces a modified sync pulse for every 262 standard horizontal sync pulses received. The modified sync pulse is used to control the rotational phase of the magnetic disc whereby an integer number of horizontal video lines, of a standard video signal, are recorded on one annular track of the magnetic disc.

DETAILED DESCRIPTION OF THE PREFERRED EMBODIMENT

Figure 6:
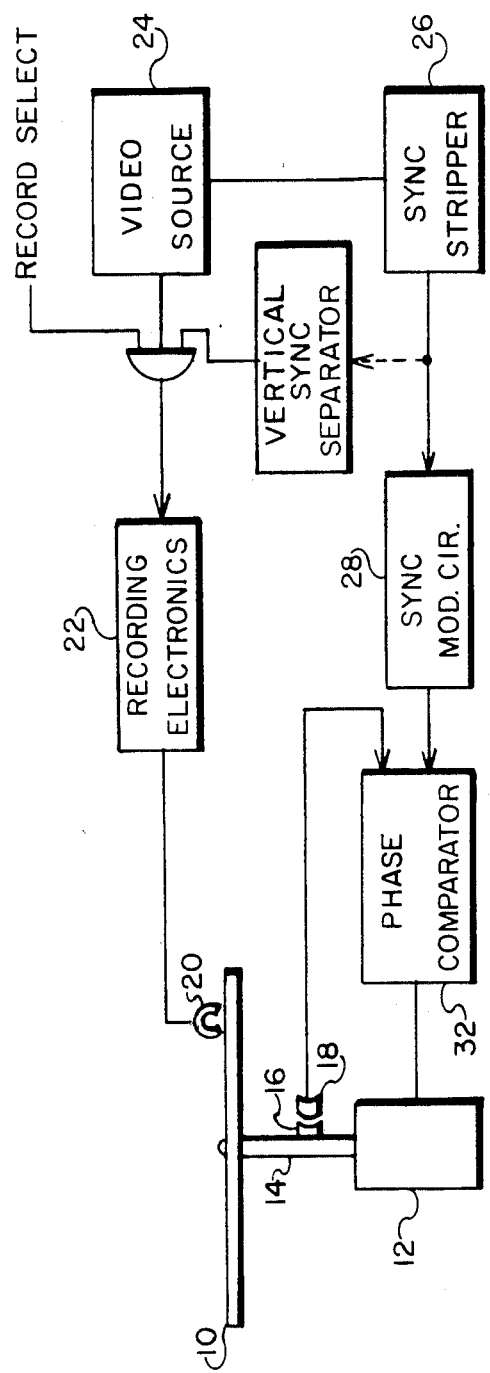

Referring to FIG. 6 of the drawings, a magnetic disc 10 containing a number of annular recording tracks, is connected to a motor 12 by a drive shaft 14. A magnet 16 is mounted on the drive shaft and a detection head 18 is provided so that, on each rotation of the drive shaft 14, the magnet 16 passes close to the detection head 18, causing the detection head to generate a signal pulse.

A record/playback head 20, which is capable of being moved incrementally along a diameter of the magnetic disc 10, is in contact with the disc and is coupled to standard recording electronics 22. The recording electronics 22 modulates the standard video signal received from a video source 24 and supplies the modulated signal to the head 20. For purposes of illustrating the invention, the video signal generated by the video source 24 will be a standard N.T.S.C. signal consisting of 525 horizontal scanning lines per frame, each frame consisting of two interlaced video fields.

The signal from the video source 24 is also provided to a sync stripper 26 that provides a composite sync signal composed of horizontal synchronization information as well as the equalization pulses and serration pulses which occur during the vertical blanking interval. The output of the sync stripper 26 is then supplied to a synchronization modification circuit 28.

The modification circuit 28, as shown in FIG. 7, consists of a 45 u sec. one-shot 29 and a 12 stage ripple counter 30 adapted to count to 262 (i.e. to the number of lines to be recorded). The one-shot is used to remove those equalization pulses and serration pulses of the composite sync signal that do not coincide with respective horizontal synchronization pulses; thus, the counter 30 is prevented from operating at twice the horizontal rate during vertical blanking. The Q8, 02 and Q1 outputs of the counter 30 are used to reset the counter 30 at a count of 262, viz. at 100000110. The signal from the Q8 output is utilized as the output signal of the circuit 28 and switches to a logic level HI when the count reaches 256. When the counter reaches 262, all three outputs are a logic HI and the output of a NAND gate 31, after being inverted by an inverter 33, resets the counter 30, as noted above. The output pulse P of the modification circuit 28 has a duration, therefore, of six horizontal sync pulses and occurs once for every 262 horizontal sync pulses counted.

As shown in FIG. 6, the output of the modification circuit 28 is then phase compared to the output of the detection head 18 by a phase comparator circuit 32 the result of which is a signal corresponding to the phase difference of the two input signals. Ihe phase difference signal from the comparator 32, controls the rotational phase of the motor 12 so that the rotation of the disc 10 is maintained at a constant phase relationship to the modified synchronization signal. The rotation of the disc 10 is therefore controlled so that one full revolution of the disc will occur with the recording of every 262 lines of the video signal.

Since each field of the standard video signal contains 262.5 lines of information, a one-half line overlap in recording will occur if one field is recorded on one annular track of the recording disc 10. The recording of the field is started at the beginning of the vertical blanking period so overlap of one-half line of recording occurs in the portion of the recording track where the vertical blanking is recorded. This will not cause any adverse effect to the reproduced video image, but the operation of the recording electronics 22 can be terminated if desired to prevent overlap recording from occurring. In one embodiment this is easily accomplished by coupling the operation of the recording electronics to the reset line of the counter. Recording would terminate when the counter was reset.

As can be seen in FIG. 8A, the resulting recorded field consists of a vertical blanking pulse followed by an integer number of horizontal lines. According to the invention, the recorded field contains 262 horizontal lines. When the track is repeatedly reproduced at the standard field rate and provided to a video monitor to produce a still image, interlacing of the field will not occur and a non-interlaced still image will result.

Figure 1:
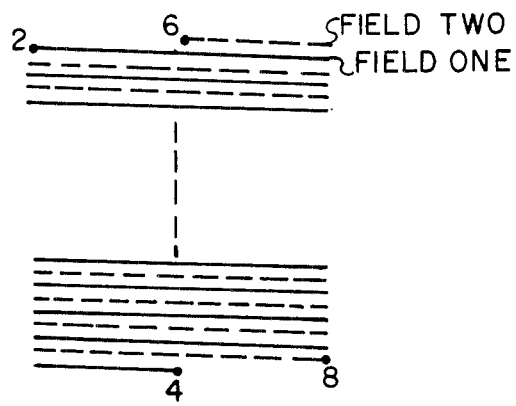
Figure 2:
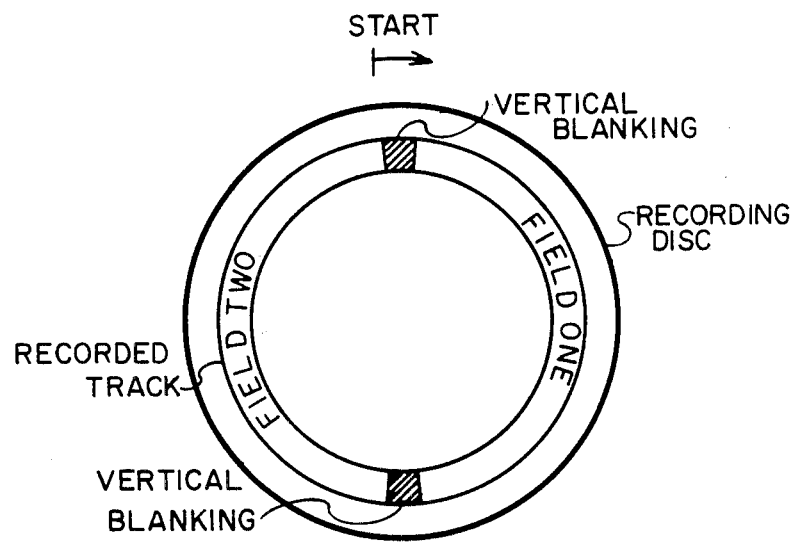
Figure 3:
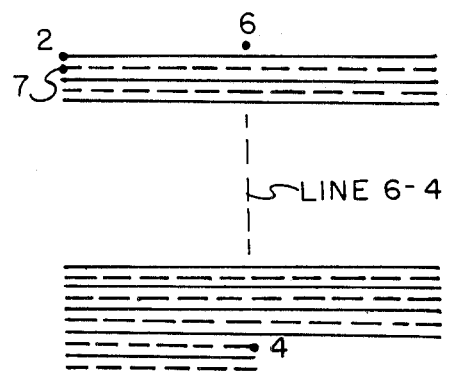
Figure 4:
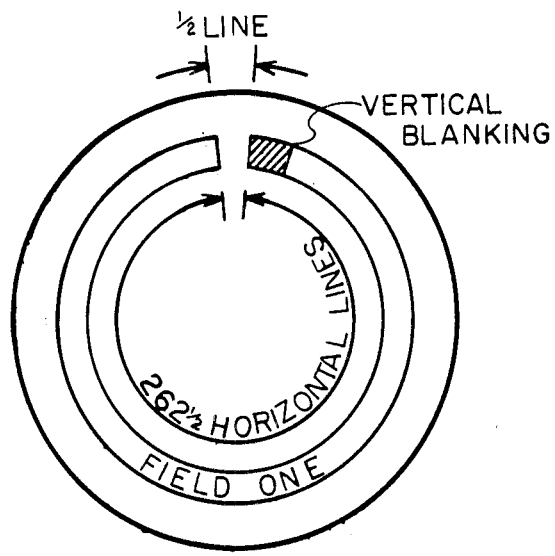
Figure 5:
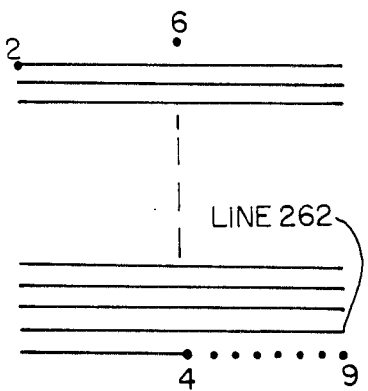

Referring to FIG. 8B, the scanning of the field will begin at the point 2 and end at a point 11 instead of continuing to the point 4 as in an interlaced scanning pattern of FIG. 1. This will cause the beam to return to the point 2 during the vertical blanking period. Although the number of displayed horizontal lines is reduced by half from conventional full frame images, the image quality is sufficient for most viewing applications. In fact, in some cases, the apparent image quality is enhanced due to the increase in contrast provided by alternately blank horizontal lines.

The use of a modified synchronization signal to control the rotational speed of a recording disc can be incorporated easily into an electronic "still" camera as shown in the block diagram FIG. 9. A lens system (not shown) images a scene onto a CCD imager 42. Standard timing logic 43 is used to clock the imager 42 and operates to produce (generator 27) a composite sync signal and a vertical sync signal. A second record/playback head 40 has been provided so the camera has the ability to record either in a full frame or a single field mode. A switch 44 is used to control the input to a phase comparator 32'.

In the single field recording mode, the switch 44 connects a sync modification circuit 28' to the phase comparator 32'; a modified sync signal being used, as with the apparatus in FIG. 6, to control the rotational phase of a motor 12'.

If a full frame image is desired, the switch 44 is connected to apply the vertical sync output of the sync generator 27 directly to the phase comparator. The rotation of the magnetic disc 10' is, therefore, synchronized to rotate one full rotation for every 262.5 lines to be recorded. The recording head 20' is utilized to record the first field of a frame on one annular track of the magnetic disc 10' and recording head 40 is utilized to record the second field of the frame on an adjacent track.

To reproduce the recorded image in either full frame or single field mode, the switch 44 connects the phase comparator 32' to the vertical sync output of the sync generator 27; and the switch 46 connects the head 20' and the head 40 to the reproduction electronics 48. The magnetic disc rotates at the standard field rate and the reproduction electronics 48 supplies the reproduced signal to the video monitor 50. Only the video information recorded by the head 20' is reproduced in the case of a single field recording.

The invention has been described in detail with particular reference to certain preferred embodiments thereof, but it will be understood that variations and modifications can be effected within the spirit and scope of the invention. For example, the horizontal synchronization modification circuit could be directly incorporated into the timing logic used to clock the CCD imager. The operation of switch 44 and the record electronics 22' could also be coupled to the exposure control system of the camera. In such an embodiment, single field recording would automatically be selected at slow shutter speeds where subject motion could cause spatial displacement in full frame images.

What is claimed is:

1. Recording apparatus for recording a video signal on an information storage disc, said apparatus comprising:
   a. driving means for rotating said information storage disc about a central axis perpendicular to the plane of said storage disc,
   b. detector means for producing a signal representative of the rotational phase of said storage disc,
   c. a recording head for receiving and recording said video signal on said information storage disc,
   d. circuit means for modifying the synchronization information contained in said video signal to produce a modified sync pulse that occurs in correspondence with an integer number of video information lines to be recorded, and
   e. comparator means coupled to said driving means for comparing the outputs of said detector means and said sync modifying circuit means for controlling the rotational phase of said storage disc,
   thereby to cause an integer number of video information lines to be recorded on an annular track of said storage disc.

2. The apparatus as claimed in claim 1 wherein:
   a. said video signal corresponds to a pair of interlaced fields forming a frame of video information,
   b. said sync modifying circuit means produces a sync pulse in correspondence with an integer number of field lines, and
   c. said detector means is of a type that produces a phase representative signal in correspondence with the field rate of said video signal.

3. In an electronic camera system, including apparatus for recording a video signal on an information storage disc, said apparatus comprising:
   a. driving means for rotating said storage disc about a central axis perpendicular to the plane of said disc,
   b. detector means for producing a signal representative of the rotational phase of said storage disc,
   c. recording electronics, including a first and second recording head, for receiving and recording said video signal on said storage disc,
   d. sync generator means for producing a standard composite video synchronization signal and a standard vertical synchronization signal,
   e. circuit means coupled to receive said composite synchronization signal from said sync generator means for producing a modified synchronization pulse that occurs in correspondence with an integer number of video information lines to be recorded,
   f. switching means for selecting the output of said circuit means or the vertical synchronization signal output from said sync generator means, and
   g. comparator means coupled to said driving means and responsive to the output of said detector means and said switching means for so controlling the rotational phase of said recording disc that said recording disc either rotates at the field rate of the video signal when said switching means is set to select the vertical synchronization signal or at a rate corresponding to the frequency of the modified synchronization signal when said switching means is set to select said modified synchronization signal.

4. A magnetic recording apparatus of the type wherein about one field of a standard interlaced video signal is recorded by a magnetic head on one annular track of a rotating recording medium, said apparatus comprising:
   a. detector means for producing a signal representative of the rotational phase of said recording medium,
   b. first circuit means for isolating the synchronization information contained in said video signal,
   c. second circuit means, coupled to said first circuit means, for modifying the synchronization information received from said first circuit means, to produce a modified synchronization signal that occurs in correspondence with an integer number of video information lines to be recorded, and
   d. means for rotating said magnetic recording medium, coupled to said detector means and said second circuit means, for rotating said recording medium synchronously with said modified synchronization signal at such a rate that it will complete on revolution in the period of time required to record an integer number of video information lines,
   thereby to cause an integer number of video information lines to be recorded on one annular track of said recording medium.

5. The apparatus as claimed in claim 4 wherein said second circuit means comprises a counter circuit that counts the horizontal sync pulses in the synchronization information and produces a signal when the number of horizontal sync pulses counted equals the number of video information lines to be recorded.

6. A method of recording an integer number of video information lines from an interlaced video signal on one annular track of a rotatable recording medium comprising the steps of:
   a. producing a modified synchronization signal, based on the synchronization information contained in said video signal, that corresponds to the number of video information lines to be recorded,
   b. detecting the rotational phase of the recording medium,
   c. comparing the rotational phase of the recording medium to the phase of the modified synchronization signal, and
   d. controlling the rotational phase of said recording medium, whereby the recording medium completes one revolution in the period of time required to record an integer number of video information lines.

7. An electronic camera apparatus, including a recording disc for recording video signals, said apparatus comprising:
   a. an optical system for forming an image of an object to be photographed,
   b. image sensing means for converting the optical image formed by said optical system into an electronic video signal,
   c. sync generating means for generating a vertical synchronization signal and a composite synchronization signal,
   d. circuit means, coupled to receive the composite synchronization signal from said sync generating means, for producing a modified sync signal that occurs in correspondence with an integer number of video information lines to be recorded,
   e. switching means for selecting either the output of said circuit means or the vertical synchronization signal from said sync generating means,
   f. drive means coupled to said switching means for so controlling the rotational phase of said recording disc that said recording disc either rotates at the field rate of a standard video signal when said switching means is set to select the vertical synchronization signal, or at a rate corresponding to the frequency of the modified sync signal when said switching means is set to select the output of said circuit means.

8. The apparatus as claimed in claim 7 wherein said circuit means comprises a counter circuit that counts the number of horizontal sync pulses in the composite synchronization signal and produces a signal when the number of horizontal sync pulses counted equals the number of video information lines to be recorded.

9. The apparatus as claimed in claim 7 wherein the number of video information lines to be recorded is substantially equal to the number of video lines in one standard video field.

* * * * *